United States Patent [19]

Knecht

[11] 4,204,465

[45] May 27, 1980

[54] STEAM AND HOT LIQUID DISPENSING DEVICE

[75] Inventor: Helmut Knecht, Clark, N.J.

[73] Assignee: Adams Industries, Inc., Union, N.J.

[21] Appl. No.: 961,612

[22] Filed: Nov. 17, 1978

[51] Int. Cl.² ............................................. A47J 31/54
[52] U.S. Cl. ........................................ 99/293; 99/300
[58] Field of Search ................ 99/293, 294, 281, 283, 99/316, 291, 302 R, 300, 307

[56] References Cited

U.S. PATENT DOCUMENTS

| | | | |
|---|---|---|---|
| 1,185,073 | 5/1916 | Ehrheart | 99/300 |
| 2,796,018 | 6/1957 | Stiebel | 99/293 |
| 4,137,833 | 2/1979 | Yelloz | 99/293 |

*Primary Examiner*—Edward J. McCarthy
*Attorney, Agent, or Firm*—Weingram & Klauber

[57] ABSTRACT

A steam and hot liquid dispensing device has a pressure sealable container in which liquid under pressure is heated to produce steam and/or super-heated liquid. A dispensing mechanism includes a valve device which selectively delivers steam or super-heated liquid through separate outlets from the heated container.

16 Claims, 5 Drawing Figures

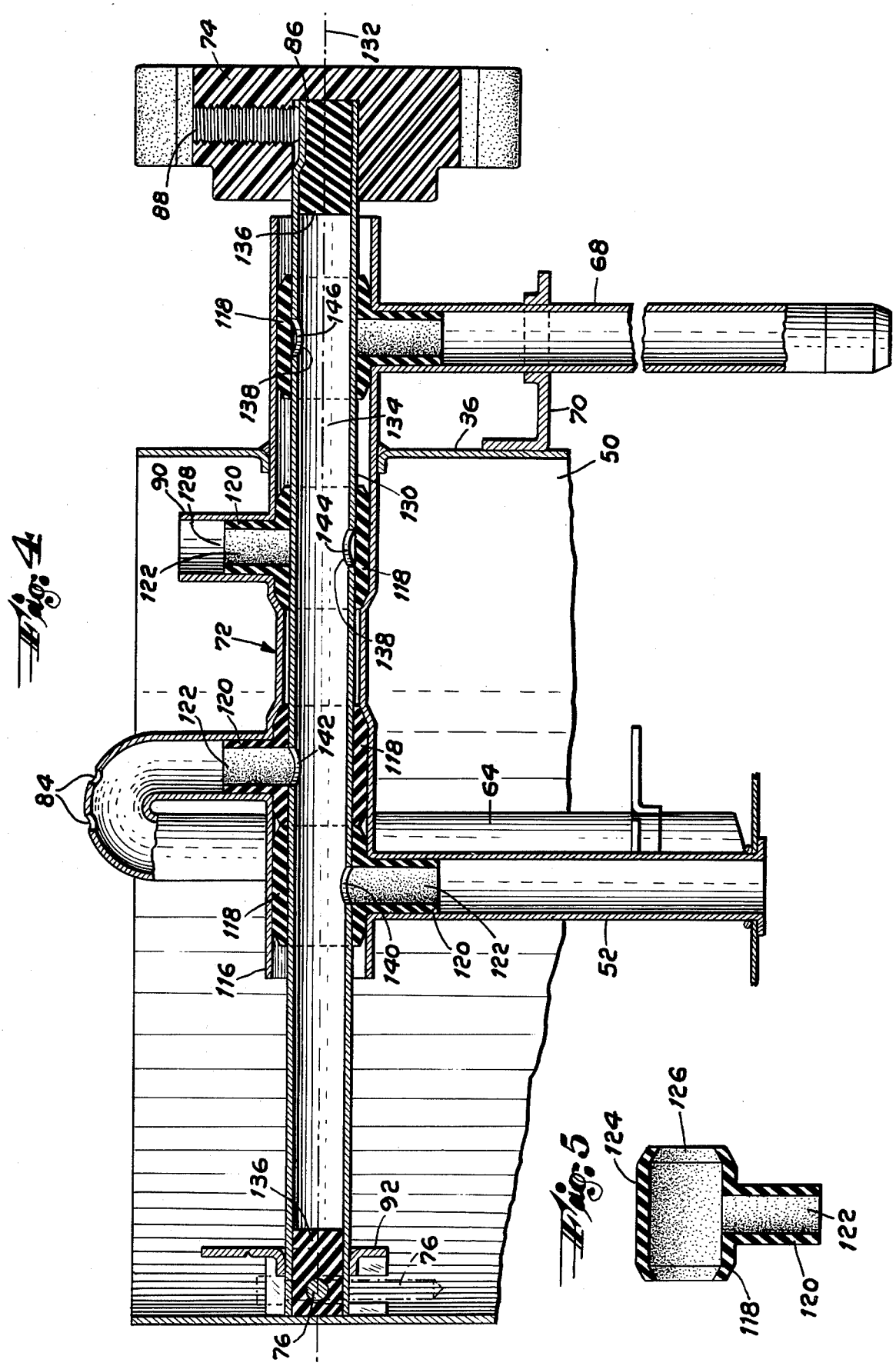

STEAM AND HOT LIQUID DISPENSING DEVICE

BACKGROUND OF THE INVENTION

1. Field of the Invention

This invention relates to a machine for producing steam and/or hot liquids, and more particularly, a machine for making espresso and cappuccino coffee and other type drinks requiring selective delivery of steam and/or hot water.

2. Description of the Prior Art

A wide variety of espresso coffee machines have been marketed. Most of them require complex valving, are cumbersome to use, and expensive to manufacture. In many of these machines, valves must be actuated manually to control the rate of infusion of the coffee being prepared. Frequently these machines do not have provision for a separate steam outlet which is necessary for cappuccino preparation. Many of the machines that do provide separate steam outlets require substantial separation of the portion of the apparatus used to produce steam from that portion used to provide hot water.

SUMMARY OF THE INVENTION

In order to overcome the problems discussed above, the present invention sets forth a steam and hot water dispensing device having a sealable heated container in which liquid is heated under pressure to produce steam and superheated liquid. A dispensing device includes valving mechanism which allows selective delivery of steam and/or superheated liquid from the heated container through separate outlets.

Accordingly, it is an object of the present invention to provide a novel and improved espresso and cappuccino coffee machine which is simple to operate in both modes of use, and can be easily converted from one mode of use to another.

Another object of the present invention is to provide a novel and improved espresso and cappuccino coffee machine which can safely deliver a supply of steam for cappuccino production and does not interfere with other uses or modes of operation of the machine.

Yet another object of the present invention is to provide a novel and improved espresso and cappuccino machine having a housing enclosing a chamber holding both steam and hot water and all heating apparatus relating thereto.

A further object of the invention is to provide a novel and improved espresso and cappuccino coffee machine having a base housing and a hollow column extending therefrom to support a self-contained closed housing for the steam and liquid to be provided by the apparatus.

Still another object of the present invention is to provide a novel and improved espresso and cappuccino coffee machine which has a coffee infusing chamber attachable to the underside of the steam generating portion of the machine that is disposed over the base of the housing to enable the base of the housing to serve as a platform for the espresso receiving container.

Yet another object of the present invention to provide an improved espresso and cappuccino coffee machine having a valve assembly that quickly and effectively controls the operating mode of the machine.

Still a further object of the present invention is to provide a novel and improved espresso and cappuccino coffee machine which is relatively economical to manufacture, which is relatively reliable in operation, and durable in service.

Other objects and advantages will be apparent from the following description of the preferred embodiment of the invention, and the novel features will be particularly pointed out hereinafter in connection with the appended claims.

BRIEF DESCRIPTION OF THE DRAWINGS

FIG. 3 is a horizontal cross sectional view of the machine taken along line 3—3 of FIG. 2 with portions of the top cover broken away;

FIG. 4 is an enlarged detail view of the selector valve arrangement of FIG. 3 with portions of the outer tube and valving tee portions thereof broken away;

FIG. 5 is an enlarged cross-sectional view of the valving tee portion of FIG. 4;

DESCRIPTION OF THE PREFERRED EMBODIMENT

Figure 1:
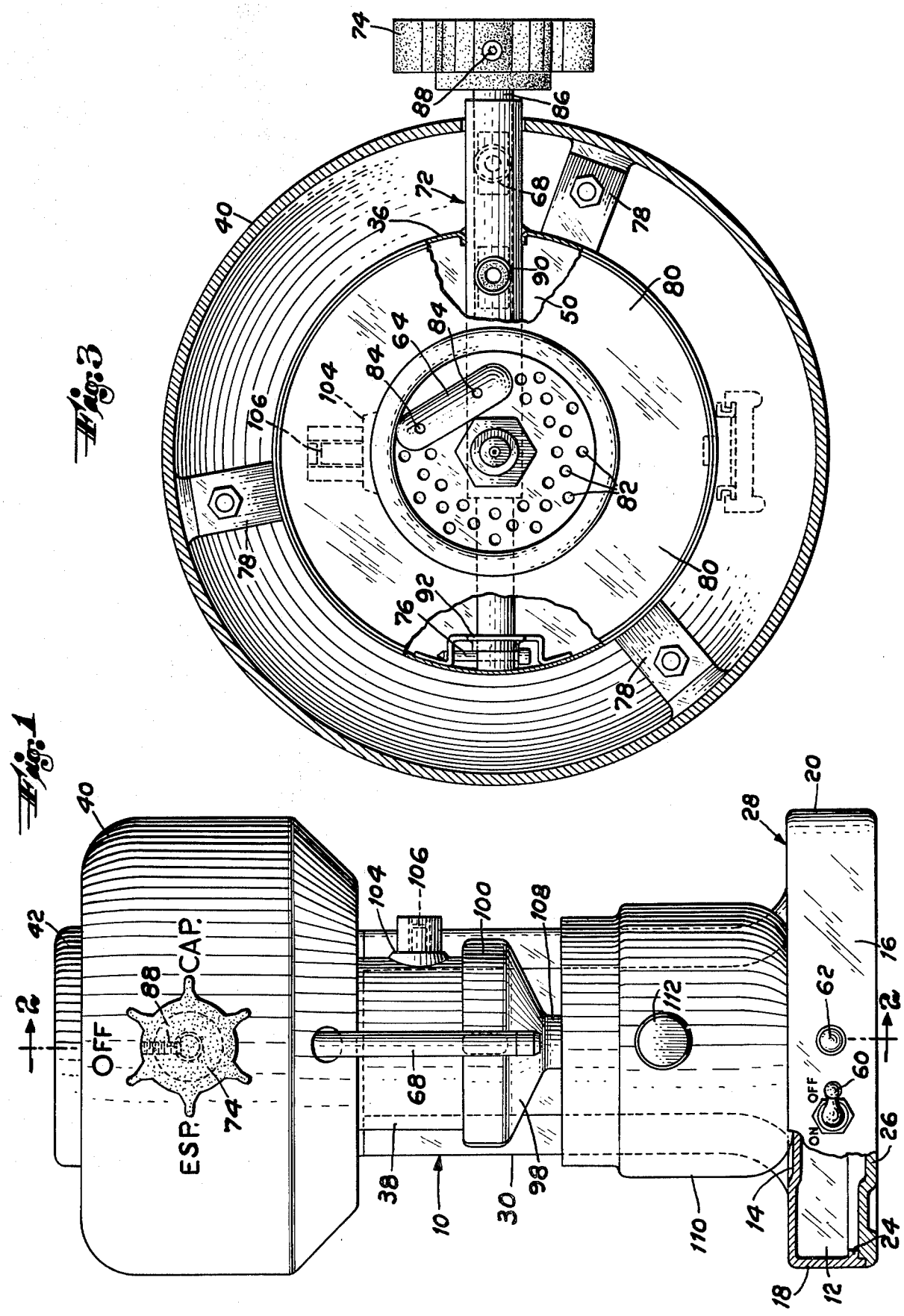
FIG. 1 is a front elevation of an espresso coffee and cappucino machine built in accordance with the teachings of this invention.

In referring to the drawing, like numerals refer to like and/or corresponding parts throughout the various views. An espresso coffee machine, referred to generally by reference numeral 10, is shown in FIG. 1, to illustrate the invention. The coffee machine has a base 12 having an upper surface, front and rear walls, and sidewalls. The upper surface is structured to include pot-receiving plate 14. Front wall 16, sidewalls 18 and 20, and rear wall 22 extend downwardly from the sides of the upper surface. Inwardly projecting flanges 24 are formed at the lower edge of the sidewalls 18 and 20. An access plate 26 is removably secured to flanges 24.

Figure 2:
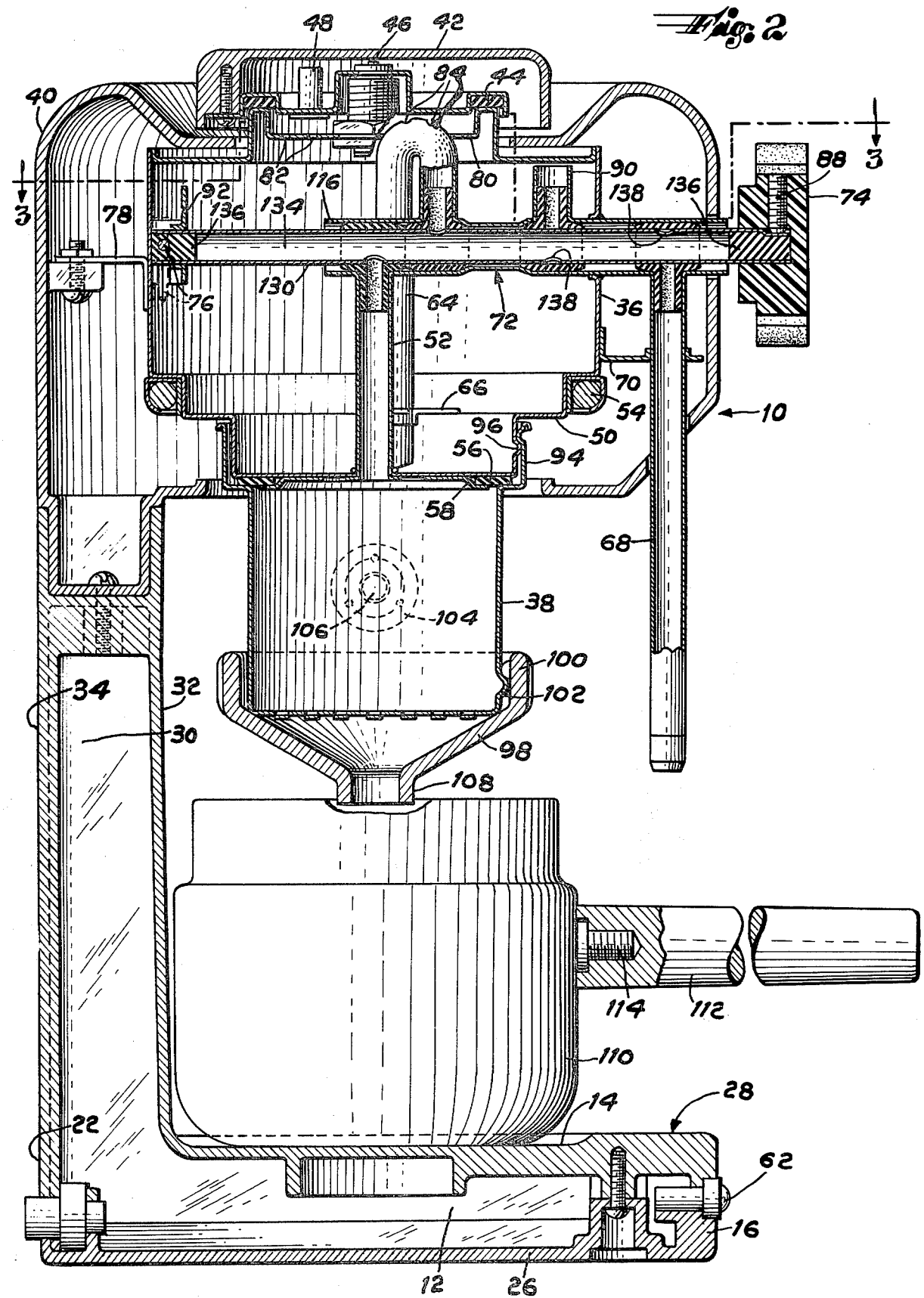
FIG. 2 is a vertical cross-sectional view of the machine taken along line 2—2 of FIG. 1.

The pot-receiving plate 14, walls 16, 18, 20, and 22 and access plate 26 constitute a base housing 28 for receiving and enclosing electrical apparatus, which housing can be entered for repair and replacement of electrical items by removing access plate 26. A support column 30, FIG. 2, having a hollow, enclosed interior is mounted upon base housing 28. The front face 32 thereof meets and extends from the upper surface of base 12. The rearward face 34 thereof meets and extends from the rear wall 22. In this manner, the hollow interior of support column 30 forms an electrical conduit for the coffee machine.

At the upper end of support column 30 is mounted a sealable container for holding liquid and steam under pressure, also referred to as a steam and hot water generating chamber 36, which in turn supports a liquid receptacle or coffee infusing chamber 38. The generating chamber 36 is jacketed by an outer shell or generator housing 40 which is secured to the support column 30.

The housing 40 includes a pressure cap unit 42 centrally mounted to the upper surface of the generating chamber. Gasket 44 is sealingly interposed between the body of pressure cap unit 42 and the uppermost edge of the generating chamber. The gasket 44 is secured to the underside of the pressure cap unit 42.

The pressure cap unit also includes a relief valve 46 for releasing steam to atmosphere when maximum pressure is exceeded and a whistle 48 for indicating when a usable "head" of steam is available.

The steam generating chamber 36 is provided with a water-receiving chamber or sump 50 having a centrally disposed espresso tube or hot water outlet 52 for conducting steam from the generator to the infusing chamber 38. The water-receiving chamber is preferably constructed of food-grade, stainless steel. A heating ring 54 surrounds the outer, lower midsection of the water-receiving chamber 50. The ring is preferably a 600-watt Calrod device. A gasket seal 56 is interposed between the underside of chamber 50 and the uppermost lip of infusing chamber 38, and seal retainer 58 secures the seal 56 in place.

The electrical controls and pilot light for the heating ring 54 are conveniently mounted on the front wall 16, (FIG. 1) or base housing 28 and consist of an ON/OFF switch 60 and associated pilot light 62.

The steam generating chamber 36 is also constructed to include a siphon tube 64 supported by a holder 66 and a steam tube 68 secured to housing 40 adjacent the front wall of water-receiving chamber 50 by a steam-tube holder 70.

Interconnecting espresso tube 52, siphon tube 64, and steam tube 68 is a selector valve arrangement 72 mounted horizontally within the upper portion of the steam generating chamber 36. In the embodiment shown, the selector valve extends radially from the espresso tube 52 rearwardly to the wall of chamber 36 and forward through the wall of chamber 36 and the front of the housing 40. A selector knob 74 is secured to the forward end of the valve 72 and a pivot and stop pin unit 76 is secured to the rearward end of the valve.

Referring now to FIG. 3 a top elevational view of chamber 36 is shown. Mounting brackets 78 are arrayed at 120 degree intervals about generating chamber 36 and are bolted to brackets extending from housing 40. The elevational view of FIG. 3 show the foraminous portion of top cover 80 having apertures 82 permitting passage of steam from the generator to relief valve 46 and whistle 48. The uppermost surface of siphon tube 64 is illustrated as having vent holes 84 for preventing air lock upon operation thereof. Selector knob 74 is secured to the valve shaft end 86 by setscrew 88. The breaking away of top cover 80 shows on one side of the valve 72 a steam inlet provision 90 and at the other end a valve support bracket 92, which serves to support valve 72 and trap stop pin 76 to axially position a part of the valve, described below.

Returning briefly to FIG. 2, the details of the coffee infusing chamber or liquid receptacle 38 are now discussed. The chamber 38 is structured to be detachably secured to the bottom of sump 50 by clip portion 94 on chamber 38 coacting with a detent 96 on sump 50. A funnel is also structured to be detachably secured to the bottom chamber 38 by clip portion 100 and detent 102. An infuser handle 104 is attached to stud 106 to facilitate handling of the infusing unit. Below the funnel outlet 108 is provision for an espresso pot 110 having a similar pot handle 112 and stud 114 arrangement.

Referring now to FIGS. 4 and 5, the selector valve arrangement 72 is shown in detail. Unit 72 has a stationary outer valve tube or common tube 116 for connection to espresso tube 52, siphon tube 64, steam outlet tube 68 and steam inlet tube 90. The outer valve tube 116 is constructed to receive four tees or valving members 118 preferably of resilient silicone or similar resilient composition. Each tee 118 has a tubular stem portion 120 with a small opening 122 therethrough and a tubular crosspiece body 124 with a large opening therethrough.

The tee 118 is secured within the outer tube by collapsing the body 124 so that the wall thereof is pushed against the stem and inserting the collapsed unit into the outer valve tube until the stem reaches the desired port, for example, port 128 in the wall of outer valve tube 116. The lodging of stem portion 120 in the port prevents rotation of the valving tee during operation.

The valve unit 72 includes a rotatable inner valve tube, or transfer tube 130 which, when installed within the outer valve tube 116, has the longitudinal axis 132 thereof coincident with that of the outer tube. The inner valve tube 130 is dimensioned so that the outer surface fits sealingly against the inner surface of the crosspieces 124 of the valving tees. The inner valve tube is a hollow cylinder having a central passageway 134 therein with plugs 136 at each end.

Between the ends of transfer tube 130 are various apertures or ports for example, steam inlet port 144 for communication of the tee openings 122 with the transfer passageway 134. The ports are disposed along the axis of transfer tube 130 to align with the corresponding delivery or discharge tubes (such as the siphon tube 64) when the transfer tube 130 is properly positioned by means of the coaction of stop pin 76 with the support bracket 92. The ports are angularly dispersed on the transfer tube so that rotation of the transfer tube between a first position and a second position 180 degrees apart, will cause different sets of the ports to register with the corresponding delivery or discharge tube.

The selector knob 74 is arranged to rotate the inner valve tube or transfer 130 and the various ports are more particularly designated, espresso tube port 140, siphon tube 142, steam inlet port 144, and steam port 146. They are constructed to be opened and closed in accordance with the following table:

| KNOB 74 POSITION | POSITION NAME | PORT 140 ESPRESSO | PORT 142 SIPHON | PORT 144 STEAM INLET | PORT 146 STEAM TUBE |
|---|---|---|---|---|---|
| 0 | Espresso | Open | Open | Closed | Closed |
| 90 | Off | Closed | Closed | Closed | Closed |
| 180 | Cappuccino | Closed | Closed | Open | Open |

In operation for making espresso coffee, the machine is filled with a predetermined volume of water and the coffee infusion chamber is filled with a corresponding amount of expresso ground coffee. The heater for the steam generating unit is operated until a head of steam is available. The selector valve is then placed at the "ESPRESSO" position whereupon boiling water, under pressure of the head of steam, is siphoned from the sump of the pressurized chamber to the espresso tube. Any entrapped air or vapor escaped through vent holes in the upper portion of the siphon tube.

Similarly, when the machine is used for cappuccino production, the pressurized chamber is filled with a predetermined volume of water. The heater for the steam generating unit is again operated until a head of steam is available. The steam outlet tube is then inserted into a carafe of cold milk so that the outlet is below the liquid level. The selector valve is then placed at the "CAPPUCCINO" position whereupon steam drawn from the top of generating chamber 36 is injected into the milk causing the milk to foam. The selector valve is returned to "OFF" position and the carafe of foamed milk is removed from the machine.

While the preferred forms and arrangements have been shown, it is clearly understood that various changes in detail and arrangement of parts may be made without departing from the spirit and scope of this disclosure.

What is claimed is:

1. A steam and hot water dispensing device comprising;
   a sealable container for holding liquid and steam under pressure;
   heating means to heat said sealable container;
   a common tube for liquid and steam disposed at least partially within said sealable container;
   liquid inlet means communicating with said common tube,
   liquid outlet means communicating with said common tube and extending from said sealable container to carry liquid discharged from said sealable container;
   steam inlet means communicating with said common tube;
   steam outlet means communicating with said common tube and extending from said sealable container to carry steam discharged from said sealable container;
   a transfer tube disposed at least partially within said common tube;
   passage means in said transfer tube to selectively and alternatively communicate said common tube steam inlet means with said steam outlet means and said liquid inlet means and said liquid outlet means; and
   positioning means to selectively position said transfer tube so that said transfer tube passage means will selectively communicate said liquid inlet means with said liquid outlet means and said steam inlet means with said steam outlet means.

2. The apparatus for dispensing liquid and steam as claimed in claim 1 further comprising:
   a liquid receptacle disposed beneath said sealable container;
   and wherein said liquid outlet means extends upward from the bottom of said sealable container to communicate with said common tube.

3. The apparatus for dispensing liquid and steam as claimed in claim 1 further comprising a valving member for each of said steam and liquid inlet and outlet means in said common tube to prevent flow within said common tube and direct flow from said common tube to and from said transfer tube.

4. The apparatus for dispensing liquid and steam as claimed in claim 3 wherein each of said valving members comprise:
   a first tubular section concentrically disposed about said transfer tube and
   a second tubular section extending through said common tube to connect with one of said inlet and outlet means for liquid and steam.

5. The apparatus for dispensing liquid and steam as claimed in claim 1 wherein said sealable container for liquid and steam comprise:
   a strainer portion formed in the upper end of said container;
   fastening means extending from the upper end of said container;
   pressure cap means adapted to coact with said fastening means to provide a pressure tight seal over the strainer portion of said sealable container to seal said container.

6. The apparatus for dispensing liquid and steam as claimed in claim 1 wherein;
   said sealable container for liquid and steam comprise a lower portion forming a sump therein for collection of liquid; and
   said end of said liquid inlet means comprise tube means extending into said sump portion of said sealable container to draw liquid therefrom.

7. The apparatus for dispensing liquid and steam as claimed in claim 6 wherein said heating means to heat said sealable container comprise a heating coil disposed about said sump portion of said sealable container.

8. Apparatus for dispensing liquid and steam as claimed in claim 7 further comprising fastening means disposed on said sump portion of said sealable container adapted to coact with fastening means on fasten said liquid receptable to said sealable container.

9. The apparatus for dispensing liquid and steam as claimed in claim 8 further comprising a liquid receptacle having an expresso type coffee basket adapted for the passage of liquid through coffee grounds stored in said container.

10. The apparatus for dispensing liquid and steam as claimed in claim 1 wherein said positioning means to selectively position said transfer tube extending from said sealable container to rotate said transfer tube within said common tube to alternatively bring said passage means for inlet and outlet of steam into registration with said inlet and outlet means for steam in said common tube while simultaneously moving said passage means for the inlet and the outlet of liquid out of registration with the passage means in said common tube for inlet and outlet of liquid, and the reverse thereof.

11. The apparatus for dispensing liquid and steam as claimed in claim 1 further comprising plug means sealing at least one end of said transfer tube.

12. The apparatus for dispensing liquid and steam as claimed in claim 11 wherein said positioning means to selectively position said transfer tube comprise:
   stop pin means extending from said transfer tube; and
   bracket means extending from said wall of said sealable container for liquid and steam to limit rotative movement of said stop pin.

13. The apparatus for dispensing liquid and steam as claimed in claim 1 further comprising:
   a potholding platform, disposed below said liquid receptacle: and
   a support column extending from said pot-holding platform and supporting said sealable container.

14. The apparatus for dispensing liquid and steam as claimed in claim 6 wherein said inlet means comprise:
   an inverted "U" shaped tube extending upward from said common tube and then turning downward to extend into said sump; and
   vent means in said inverted "U" shaped tube disposed at the top portion thereof.

15. The apparatus for dispensing liquid steam as claimed in claim 4 wherein said valving members each comprise:
   a resilient body;
   a first resilient tubular section disposed within said common tube axially parallel to the axis of said common tube; and a second resilient tubular section intersecting said first resilient tubular section and extending from within said common tube into the associated one of said inlet and outlet means for liquid and steam communicating with said common tube.

16. The apparatus for dispensing liquid and steam as claimed in claim 15 wherein:

said inlet and outlet steam and liquid means communicating with said common tube comprise tubular members connected to said common tube;

said common tube having passage means in the wall thereof in registration with said tubular members; and said second resilient tubular sections of said valving members extend from within said common tube through the associated passages of said common tube.

* * * * *